(12) United States Patent
Cao et al.

(10) Patent No.: US 9,295,275 B2
(45) Date of Patent: Mar. 29, 2016

(54) WHIPPABLE TOPPING WITH HIGH FREEZE-THAW STABILITY

(71) Applicant: Dow Global Technologies LLC, Midland, MI (US)

(72) Inventors: Kevin K Cao, Shanghai (CN); Zheng Y Yan, Shanghai (CN); Yutian Shi, Shanghai (CN); Xiuqin Shi, Shanghai (CN)

(73) Assignee: Dow Global Technologies LLC

( * ) Notice: Subject to any disclaimer, the term of this patent is extended or adjusted under 35 U.S.C. 154(b) by 0 days.

(21) Appl. No.: 14/433,931

(22) PCT Filed: Oct. 25, 2012

(86) PCT No.: PCT/CN2012/083492
§ 371 (c)(1),
(2) Date: Apr. 7, 2015

(87) PCT Pub. No.: WO2014/063327
PCT Pub. Date: May 1, 2014

(65) Prior Publication Data
US 2015/0237899 A1  Aug. 27, 2015

(51) Int. Cl.
*A23L 1/22* (2006.01)
*A23D 7/00* (2006.01)
*A23D 7/005* (2006.01)
*A23L 1/19* (2006.01)

(52) U.S. Cl.
CPC .............. *A23L 1/22058* (2013.01); *A23D 7/003* (2013.01); *A23D 7/0053* (2013.01); *A23L 1/19* (2013.01); *A23V 2002/00* (2013.01)

(58) Field of Classification Search
CPC .... A23L 1/22058; A23L 1/19; A23D 7/0053; A23V 2002/00
See application file for complete search history.

(56) References Cited

U.S. PATENT DOCUMENTS

| 3,066,028 A | 11/1962 | Perini et al. |
| 4,251,560 A | 2/1981 | Dell et al. |
| 4,451,492 A | 5/1984 | Dell et al. |
| 4,770,892 A | 9/1988 | Grealy et al. |
| 5,077,076 A | 12/1991 | Gonsalves et al. |
| 5,384,145 A | 1/1995 | Gonsalves et al. |
| 5,518,752 A | 5/1996 | Ito et al. |
| 5,609,904 A | 3/1997 | Koh et al. |
| 5,759,609 A | 6/1998 | Lynch |
| 5,962,058 A | 10/1999 | Ono et al. |
| 6,203,841 B1 | 3/2001 | Lynch et al. |
| 2007/0071874 A1 | 3/2007 | Cash et al. |
| 2008/0038435 A1 | 2/2008 | Miller |

FOREIGN PATENT DOCUMENTS

| EP | 1430790 A1 | 6/2004 |
| GB | 2437239 A | 10/2007 |
| WO | 2009023560 A1 | 2/2009 |

*Primary Examiner* — Kelly Bekker

(57) ABSTRACT

A whippable topping composition comprising: (a) water-soluble carbohydrates, (b1) hydrogenated vegetable fat, (b2) optionally milk fat, (c) an emulsifier formulation having an HLBFormulation value of less than 9, (d1) a first hydroxypropyl methylcellulose, (d2) a second hydroxypropyl methylcellulose, (e) protein, (f) optionally a non-protein hydrocolloid stabilizer, and (g) water, wherein the weight ratio of first hydroxypropyl methylcellulose (d1) to second hydroxypropyl methylcellulose (d2) is within the range of from 3:1 to 13:1.

12 Claims, 1 Drawing Sheet

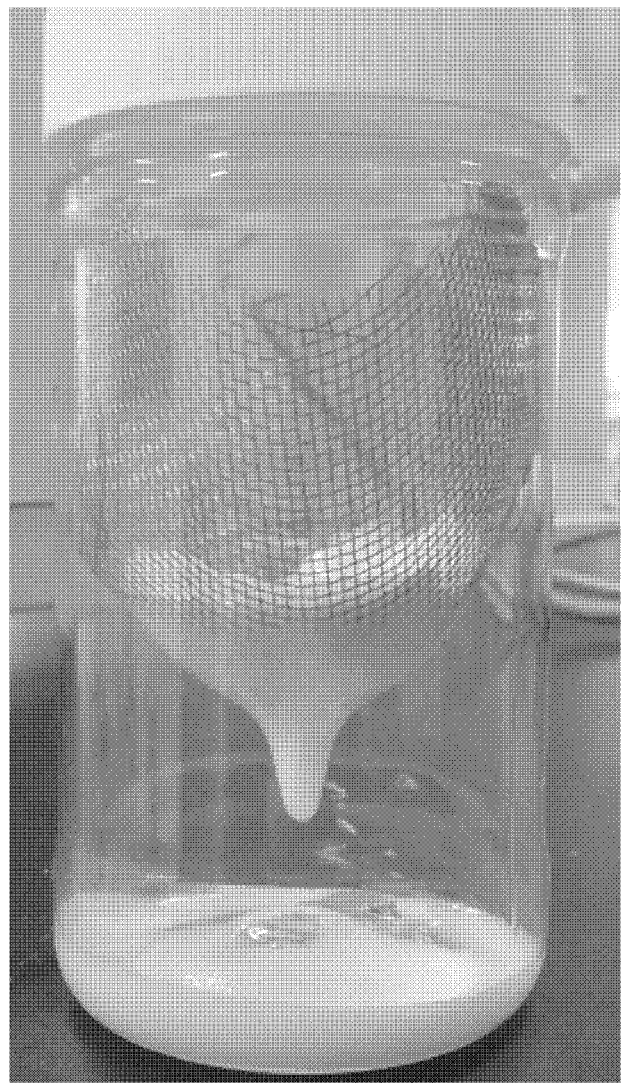

WHIPPABLE TOPPING WITH HIGH FREEZE-THAW STABILITY

FIELD

The present invention relates to a whippable topping composition comprising hydroxypropyl methylcellulose and having high freeze-thaw stability.

INTRODUCTION

There are numerous milk fat containing and non-dairy whippable toppings in the market. Non-dairy whippable toppings contain no dairy products at all, i.e. no milk fat and no sodium caseinate. Such non-dairy whippable toppings are typically made from oils such as partially hydrogenated palm kernel oil and from sweeteners such as corn syrup. Emulsifiers and stabilizers such as natural gums and/or cellulose ethers are also usually added. Sometimes, non-dairy whipped toppings exhibit inferior mouthfeel and taste compared to real whipped cream because of the high melting point of partially hydrogenated vegetable fats.

Compared to non-dairy whipped toppings, whipped cream whose oil phase is 100% milk fat has good mouthfeel and taste but suffers from poor thermal stability and low firmness due to its low melting point. These drawbacks lower the decoration utilizations of whipped cream. Accordingly, the demand for whipped toppings which have good mouthfeel and taste in combination with good decoration properties has been growing substantially in recent years and numerous milk fat containing whippable toppings have been developed and put on the market.

For hygienic, aesthetic and economic reasons the majority of producers prefer to store whippable toppings, including milk fat containing as well as non-dairy whippable toppings, in the frozen state at −18° C. Selling the whippable topping in the frozen state prolongs its shelf life, prevents unaesthetic phase separation, such as creaming, flocculation, etc. and allows utilization of existing −18° C. storage and transportation facilities.

Nevertheless, storage and transportation of whippable toppings at −18° C. has a considerable disadvantage: Freezing deteriorates the properties of the thawed product as the known whippable toppings suffer from poor freeze-thaw stability. When the end user whips the whippable topping after it is thawed at about 4° C., its performance like overrun and thermal stability declines compared to its performance before frozen, which is unacceptable to the end users.

Various milk fat containing and non-diary whippable toppings have been reported in the prior art:

GB 2 437 239 A describes a low fat whipping cream having 20% or less total fat and comprising milk, additional dairy fat and milk powder; a starch; a polysaccharide selected from maltodextrin, glucose syrup and cellulose; a non-dairy lauric fat such as hydrogenated palm kernel oil; an emulsifier mix; and a hydrocolloid mix comprising at least guar gum and carrageenan gum and optionally hydroxypropyl methylcellulose. The hydroxypropyl methylcellulose is not specified and in none of the exemplary whipping creams hydroxypropyl methylcellulose is present.

US 2007/0071874 A1 is directed to a cream composition comprising a cellulose ether compound selected from hydroxypropyl cellulose, hydroxypropyl methylcellulose (HPMC), methyl hydroxyethyl cellulose, methylcellulose, ethylcelluose and blends thereof; a water-soluble or water-swellable hydrocolloid stabilizer; a fat; an emulsifier; and an aqueous phase. The fat is preferably a milk fat, but alternatively vegetable oils can be used. In the examples several cream formulations comprising HPMC (different grades of Benecel®) always in combination with a dairy fat and carrageenan as stabilizer are described. Mixtures of different types of HPMC within one formulation are not disclosed. The aim of US 2007/0071874 A1 is to provide a cream composition that may be subjected to high temperature treatment and produces a stable cream.

U.S. Pat. No. 5,609,904 A teaches whipping cream compositions having improved acid resistance and freeze resistance in the pre-whipped state. The cream-like composition comprises fat including vegetable and animal fats (e.g. butter fat); a combination of casein protein and whey protein; a specific emulsifier combination; at least on edible fiber; sugar; and water. Natural occurring polysaccharides and synthetic stabilizers such as carboxymethyl cellulose and methylcellulose are mentioned as optional components. The freeze-thaw stability of the unwhipped emulsion prior to whipping is not discussed.

U.S. Pat. No. 5,077,076 A is directed to a refrigerator-stable, frozen, whipped topping comprising fat, non-fat milk solids, phosphate salts, gums, sodium caseinate, emulsifying agents, water-soluble carbohydrates and water. The polysaccharide gums can be vegetable gums or synthetic gums such as carboxymethyl cellulose and methylcellulose, a combination of xanthan gum and galactomannan gum being especially useful. The fats are preferably vegetable fats or oils whereas animal fats such as milk fat would be functional but are preferably avoided.

U.S. Pat. No. 5,384,145 A concerns a freeze-thaw stable, preferably non-dairy, frozen whipped topping comprising water, water-soluble carbohydrates, fat, chemical emulsifier, water-soluble protein and hydrocolloid stabilizing agent. The hydrocolloid stabilizing agent is a polysaccharide gum which can be a vegetable gum or a synthetic gum such as carboxymethyl cellulose and methylcellulose, a combination of xanthan gum and galactomannan gum being especially useful. The fats are preferably vegetable fats or oils whereas animal fats such as milk fat would be functional but are preferably avoided.

U.S. Pat. No. 4,451,492 provides a process for preparing a real cream frozen whipped topping having improved freeze-thaw stability. The frozen whipped topping comprises milk fat in combination with another animal fat or a vegetable fat; protein; stabilizer other than protein such as a vegetable or synthetic gum including carboxymethyl cellulose and methylcellulose; emulsifier; carbohydrate; a calcium chelating agent which is the salt of a phosphorous oxyacid; and water.

U.S. Pat. No. 4,251,560 also relates to a process for preparing a real cream frozen whipped topping having improved freeze-thaw stability. The frozen whipped topping comprises milk fat; modified starch; emulsifier; stabilizer such as a vegetable or synthetic gum including carboxymethyl cellulose and methylcellulose; carbohydrate; and water.

The above references do either not address the freezing issue at all or only discuss the freeze-thaw stability of the topping in the already whipped state which is different from the freeze-thaw stability of the topping composition to be whipped.

U.S. Pat. No. 6,203,841 B concerns a whipped topping that is shelf-stable at room temperature and comprises a whipped oil-in water emulsion of triglyceride fat comprising a first essentially hydrogenated oil having a iodine value of from 1 to 5 (e.g. palm kernel oil being hydrogenated to a iodine value of between 1 and 5) and a second hardening fat (e.g. fully hydrogenated form of the stearin fraction of palm oil) and including an emulsifier. The emulsion composition may further contain a stabilizer of hydrophilic colloids i.e. vegetable or synthetic gums including hydroxypropyl methylcellulose such as METHOCEL® F-50 HG. The food product for preparing the whipped topping is said to be whippable after freeze-thaw treatment as it can withstand freeze-thaw conditions. However, U.S. Pat. No. 6,203,841 B does not give any details about the whipping behavior of the topping composition after being frozen and thawed. It does not contain any example wherein whipping of a thawed sample is described. "Remaining whippable after freeze-thaw treatment" does not necessarily imply that the whipping performance after thaw is not deteriorated considerably.

Thus, the problem to be solved by the present invention is to provide a new whippable topping composition which has pleasant mouthfeel and exhibits excellent freeze-thaw stability i.e. it affords good overrun, firmness (mouthfeel), height change ratio and water syneresis when whipped, even after freezing and thawing. It is desirable that those properties do not decline considerably when whipped after a freeze-thaw cycle.

SUMMARY

The problem is solved by a whippable topping composition comprising:

(a) 10 to 30% by weight of water-soluble carbohydrates;

(b1) 8 to 30% by weight of hydrogenated vegetable fat;

(b2) optionally 0 to 13% % by weight of milk fat;

(c) 0.5 to 1.5% by weight of an emulsifier formulation consisting of 1 to n different emulsifier compounds (ci) and having an $HLB_{Formulation}$ value according to formula (I) of less than 9:

$$HLB_{Formulation} = \sum_{i=1}^{n} (HLB_i \cdot x_i) \quad (I)$$

wherein $HLB_i$ and $x_i$ are the HLB value and weight fraction (based on the total weight of the emulsifier formulation) of the ith emulsifier compound (ci);

(d1) 0.05 to 0.9% by weight of a first hydroxypropyl methylcellulose having an average degree of substitution $DS_{methyl}$ of from 1.4 to 2.5 and a 2% by weight aqueous solution viscosity of from 20 to 100 mPa·s;

(d2) 0.005 to 0.2% by weight of a second hydroxypropyl methylcellulose having an average degree of substitution $DS_{methyl}$ of from 0.8 to 1.9 and a 2% by weight aqueous solution viscosity of from 2800 to 5500 mPa·s;

(e) 0.02 to 0.4% by weight of protein; and (f) optionally 0 to 0.17% by weight of non-protein hydrocolloid stabilizer different from components (d);

(g) water in an amount adding up to 100% by weight, all percentages being based on the total weight of the whippable topping composition, wherein the weight ratio of first hydroxypropyl methylcellulose (d1) to second hydroxypropyl methylcellulose (d2) is within the range of from 3:1 to 13:1.

The present invention is also directed to a whipped topping prepared from the whippable composition and to the use of the whippable composition and the whipped topping to prepare an edible product.

Moreover, the present invention relates to a method for preparing the whippable composition.

BRIEF DESCRIPTION OF DRAWINGS

FIG. 1 illustrates an instrument for measuring water syneresis of whipped toppings.

DESCRIPTION OF EMBODIMENTS

The present inventors surprisingly found that the use of a combination of the first hydroxypropyl methylcellulose (HPMC) (d1) and the second HPMC (d2) in a weight ratio of from 3:1 to 13:1, preferably from 4:1 to 12:1, more preferably from 5:1 to 11:1, even more preferably from 6:1 to 10:1, and most preferably from 7:1 to 9:1 as stabilizer together with an emulsifier formulation having an HLB value of less than 9 in a milk fat containing topping considerably increases the freeze-thaw stability of the whippable topping composition and provides balanced performance of the whipped topping.

The whippable topping composition of the present invention comprises 10 to 30% by weight, preferably 12 to 28% by weight, more preferably 15 to 27% by weight, and most preferably 17 to 25% by weight of water-soluble carbohydrates (a), all percentages being based on the total weight of the whippable topping composition. The term "water-soluble carbohydrates" as used in the present application includes one type of water-soluble carbohydrates as well as mixtures of different types of water-soluble carbohydrates. The water-soluble carbohydrates are employed in the present whippable topping composition to supply solids and sweetness. Typically, monosaccharides (e.g. glucose (dextrose) and fructose), disaccharides (e.g. sucrose and maltose) or mixtures thereof are included to provide the desired level of sweetness.

In some embodiments the water-soluble carbohydrates are added to the whippable topping composition in the form of a syrup such as glucose syrup or glucose-fructose syrup; in these cases the water-soluble carbohydrates in the whippable topping composition may be referred to as "dry syrup solids" such as dry glucose syrup solids or dry glucose-fructose syrup solids. Glucose syrup is a liquid starch hydrolyzate of mono-, di, and higher saccharides and can be made from any source of starch; corn, wheat, rice and potatoes are the most commons sources. There are several types of glucose syrup on the market including for example high-glucose syrup and high-maltose syrup. Glucose syrup generally contains varying amounts of glucose, maltose and higher oligosaccharides and typically contains 10 to 43% by weight of glucose. The dextrose equivalent (DE) may range from 20-70. Most of the glucose syrups prepared by enzymatic hydrolysis have a DE of 60-70. The products prepared by acid hydrolysis typically have a DE of 55-60. In special cases it is possible to prepare syrups with up to 70 or even 95% by weight of maltose. A preferred glucose syrup is corn syrup comprising mainly glucose. Preferably the corn syrup has a dextrose equivalent DE of about 65. Glucose-fructose syrup (=high-fructose corn syrup HFCS) is prepared from corn syrup by enzymatic isomerization of some of its glucose to fructose. Typically, glucose-fructose syrup comprises fructose in an amount of from 40 to 58% by weight, preferably from 42 to 55% by weight; and glucose in an amount of from 40 to 58% by weight, preferably from 41 to 53% by weight, each based on dry solids. The remaining components are higher saccharides in minor amounts of from 2 to 6% by weight, based on dry solids. The use of high-fructose corn syrup as sweetener in the food industry is very common in the U.S.A. Two exemplary types of high-fructose corn syrup that may be employed in the whippable topping composition of the present invention are HFCS 55 comprising about 55% by weight of fructose, about 41% by weight of glucose, about 2% by weight of maltose and about 2% by weight of other higher saccharides; and HFCS 42 comprising about 42% by weight of fructose, about 52% by weight of glucose, and about 6% by weight of higher saccharides, each based on dry solids. Typically, the syrups that may be used to prepare the present whippable topping composition comprise 70 to 90% by weight, preferably 75 to 85% by weight, more preferably 77 to 83% by weight of water-soluble carbohydrates as described above and 10 to 30% by weight, preferably 15 to 25% by weight, more preferably 17 to 23% by weight of water.

Further exemplary water-soluble carbohydrates that are useful as sweeteners in the present invention are sucrose (preferably added in the form of granulated sugar), maltose, invert sugar, galactose, lactose hydrolyzates, lactose and mixtures thereof including mixtures with the syrups as described above.

The total amount of water-soluble carbohydrates is within the before-defined ranges.

The whippable topping composition of the present invention comprises 8 to 30% by weight, preferably 9 to 20% by weight, more preferably 10 to 18% by weight, even more preferably 11 to 17% by weight, and most preferably 12 to 16% by weight of hydrogenated vegetable fat (b1), all percentages being based on the total weight of the whippable topping composition. The term "hydrogenated vegetable fat" as used in the present application includes one type of hydrogenated vegetable fat as well as mixtures of different types of hydrogenated vegetable fat. The term "hydrogenated vegetable fat" means a vegetable fat that is fully hydrogenated or partially hydrogenated, typically hydrogenated to an iodine value of no more than 7, preferably no more than 5, more preferably no more than 3 and most preferably no more than 2. In certain embodiments the hydrogenated vegetable fat has a iodine value of from 0.15 to 7, more preferably from 0.35 to 2. The iodine value is determined according to method AOCS Official Method Cd 1-25 (Wijs method).

The hydrogenated vegetable fats used in the whippable topping composition of the present invention are preferably characterized by a typical solid fat index:

| | |
|---|---|
| 20° C. | 85-94%, preferably 87-92% |
| 22° C. | 65-75%, preferably 68-72% |
| 30° C. | 34-45%, preferably 37-41% |
| 35° C. | 10-23%, preferably 14-18% |
| 40° C. | 5-15%, preferably 7-10% |

The solid fat index (SFI) is a measure of the weight percentage of fat in the crystalline (solid) phase to total fat (the remainder being in the liquid phase) across a temperature gradient. The SFI is measured using a dilatometer that measures the expansion of a fat as it is heated; density measurements are taken at a series of standardized temperature check points.

Illustrative examples of hydrogenated vegetable fats that are useful the in present invention include hydrogenated palm kernel oil, hydrogenated coconut oil, hydrogenated cottonseed oil, hydrogenated peanut oil, hydrogenated olive oil, hydrogenated corn oil, hydrogenated soybean oil and hydrogenated palm oil, and mixtures thereof. As defined above each of the exemplary "hydrogenated" oil includes fully and partially hydrogenated oils with the preferred iodine values described above.

The total amount of hydrogenated vegetable fat(s) is within the before-defined ranges.

In addition to the hydrogenated vegetable fat the present whippable topping composition optionally comprises 0 to 13% by weight, preferably 0 to 12% by weight, and more preferably 0 to 10% by weight of milk fat (b2), all percentages being based on the total weight of the whippable topping composition. In some embodiments, the present whippable topping composition comprises 6 to 13% by weight, preferably 7 to 12% by weight, and more preferably 8 to 10% by weight of milk fat (b2). If milk fat (b2) is present, including the before-mentioned embodiments, the total amount of hydrogenated vegetable fat (b1) plus milk fat (b2) typically ranges from 10 to 35% by weight, preferably from 14 to 33% by weight, more preferably from 15 to 32% by weight, even more preferably from 16 to 31% by weight, still more preferably from 18 to 30% by weight, and most preferably from 20 to 28% by weight, all percentages being based on the total weight of the whippable topping composition. In cases where milk fat (b2) is present, including the before-mentioned embodiments, the amount of hydrogenated vegetable fat (b1) in the whippable topping composition typically ranges from 8 to 20% by weight especially including the preferred ranges for (b1) described above, or alternatively from 10 to 19% by weight or from 12 to 18% by weight, all percentages being based on the total weight of the whippable topping composition. Milk fat is also known as butter fat and designates the total amount of lipids in the milk. The presence of milk fat in the inventive whippable topping composition is optional and improves taste and mouthfeel. As milk is a natural product the composition of milk fat varies depending from breed, feeding, keeping and health of the dairy cow. Milk fat is mainly composed of fatty acid triglycerides with a varying fatty acid distribution. It has a relatively high amount of lower saturated fatty acids and a low amount of unsaturated fatty acids. A typical fatty acid distribution of milk fat is (all in % by weight based on total amount of fatty acids):

| | |
|---|---|
| butyric acid | 2.9 to 5.8% |
| caproic acid | 1.8 to 3.2% |
| caprylic acid | 1 to 1.8% |
| capric acid | 2.1 to 3.8% |
| lauric acid | 2.4 to 4.1% |
| myristic acid | 9.5 to 13.1% |
| myristoleic acid | 0.7 to 1.7% |
| pentadecanoic acid | about 1.3% |
| palmitic acid | 25.5 to 36.3% |
| palmitoleic acid | 1.3 to 2.4% |
| heptadecanoic acid | about 0.7% |
| stearic acid | 6.4 to 11.6% |
| oleic acid | 18.3 to 30% |
| elaidic acid | about 1.3% |
| linolic acid | 0.9 to 2.8% |
| linolenic acid | 0.2 to 1.4% |

The whippable topping composition of the present invention comprises 0.5 to 1.5% by weight, preferably 0.6 to 1.3% by weight, more preferably 0.7 to 1.2% by weight, and most preferably 0.8 to 1.0% by weight of the emulsifier formulation (c), all percentages being based on the total weight of the whippable topping composition. The emulsifier formulation (c) may consist of one single emulsifier compound (ci) or n different emulsifier compounds (ci). Emulsifier compounds are surfactants that are characterized by a certain HLB (hydrophilic-lipophilic balance) which is a measure of the degree to which it is hydrophilic or lipophilic. The HLB is determined by calculating values for the different regions of the surfactant molecule. The HLB values used herein refer to those values specified in "Food additives data book", edited by Jim Smith and Lily Hong-shum, published by Blackwell Science, 2003. For surfactants that are not listed in the "Food additives data book", the HLB values are determined according to the method of W. C. Griffin.

The HLB value of emulsifier formulation (c) has to be less than 9, preferably less than 8, and more preferably less than 7, in order to enhance the fat globule partial coalescence necessary to form a stable 3D network during whipping. A more hydrophilic emulsifier formulation, i.e. having an HLB of more than 9, does not result in satisfactory overrun of the whipped topping.

The HLB value of a blend comprising n different emulsifier compounds (ci) is determined by formula (I):

$$HLB_{Formulation} = \sum_{i=1}^{n} (HLB_i \cdot x_i) \quad (I)$$

wherein $HLB_i$ and $x_i$ are the HLB value and weight fraction (based on the total weight of the emulsifier formulation) of the ith emulsifier compound (ci). The natural number n of different emulsifier compounds (ci) is not critical. It can be any natural number. Preferably n is a natural number from 1 to 1000, more preferably from 1 to 100, even more preferably from 1 to 10, and most preferably from 1 to 5.

The emulsifier compounds (ci) are different from HPMC (d1) and (d2) which also have some emulsifying properties. Within the meaning of the present invention emulsifier compounds (ci) are also different from phosphate salts. Typically, the term "emulsifier compound" as used herein does not include high molecular weight polymeric compounds such as polysaccharides and modified polysaccharides. Preferably, the emulsifier compounds (ci) each have a molecular weight of less than 2000, more preferably of less than 1500. In preferred embodiments, emulsifier formulation (c) comprises one or more organic emulsifiers, i.e. at least one of the emulsifier compounds (ci) is an organic emulsifier, more preferably the emulsifier formulation (c) consists of organic emulsifier compounds (ci). The present whippable topping composition does not contain any emulsifiers in addition to the emulsifier compounds (ci) as defined.

Typical emulsifier compounds (ci) are those mentioned in the "Food additives data book". Exemplary emulsifier compounds (ci) for use in the present invention include lecithin; hydroxylated lecithin; sodium stearoyl lactylat (SSL); mono, di, or polyglycerides of fatty acids such as distilled monoglycerides (DMG), glyceryl mono- and distearate (GMS) and polyglycerol esters of fatty acids (PGE) such as triglycerol monostearate (TGMS) and hexaglyceryl distearate; polyoxyethylene ethers of fatty esters of polyhydric alcohols such as the polyoxyethylene ethers of sorbitan monostearate (Polysorbat 60 or Tween 60) or the polyoxyethylene ethers of sorbitan distearate; fatty esters of polyhydric alcohols such as sorbitan monostearate; mono- and diesters of glycols such as propylene glycol monostearate and propylene glycol monopalmitate; succinoylated monoglycerides; sucrose esters; and the esters of carboxylic acids such as lactic, citric, and tartaric acids with the mono- and diglycerides of fatty acids, such as glycerol lacto palmitate and glycerol lacto stearate; and mixtures thereof. It is a matter of fact that the emulsifier compounds (ci) must have food grade due to their use in an edible product.

In preferred embodiments a mixture of distilled monoglycerides (DMG) (HLB=5.1), glyceryl mono- and distearate (GMS) (HLB=3.8) and sodium stearoyl lactylat (SSL) (HLB=8.3) is used.

The whippable topping composition of the present invention comprises 0.05 to 0.9% by weight, preferably 0.1 to 0.7% by weight, more preferably 0.2 to 0.6% by weight, and most preferably 0.3 to 0.5% by weight of HPMC (d1) and 0.005 to 0.2% by weight, preferably 0.01 to 0.1% by weight, more preferably 0.02 to 0.08% by weight, and most preferably 0.03 to 0.06% by weight of HPMC (d2), all percentages being based on the total weight of the whippable topping composition.

HPMC (d1) for use in the present invention has an average degree of substitution $DS_{methyl}$ of from 1.4 to 2.5, preferably of from 1.6 to 2.0, and more preferably from 1.7 to 1.9 and a molar degree of substitution $MS_{hydroxypropyl}$ of from 0.1 to 0.4, preferably of from 0.1 to 0.3 and more preferably of from 0.1 to 0.2. Typically, viscosities of 2% by weight aqueous solutions HPMC (d1) at 25° C., determined with a Brookfield LVT viscometer (3# spindle, testing speed 50 rpm), range from 20 to 100 mPa·s, preferably from 40 to 70 mPa·s, more preferably from 48 to 60 mPa·s, and most preferably the 2% by weight viscosity is about 50 mPa·s. An illustrative example of commercially available HPMC (d1) that is useful in the present invention is Methocel F50 ($DS_{methyl}$=1.7-1.9; $MS_{hydroxypropyl}$=0.1-0.2; 2% by weight viscosity=50 mPa·s), available from The Dow Chemical Company, Midland, U.S.A.

HPMC (d2) for use in the present invention has an average degree of substitution $DS_{methyl}$ of from 0.8 to 1.9, preferably of from 1.0 to 1.7, and more preferably from 1.1 to 1.6 and a molar degree of substitution $MS_{hydroxypropyl}$ of from 0.1 to 0.5, preferably of from 0.1 to 0.4 and more preferably of from 0.1 to 0.3. Typically, viscosities of 2% by weight aqueous solutions HPMC (d2) at 25° C., determined with a Brookfield LVT viscometer (3# spindle, testing speed 50 rpm), range from 2800 to 5500 mPa·s, preferably from 3400 to 4700 mPa·s, more preferably from 3700 to 4300 mPa·s, and most preferably the 2% by weight viscosity is about 4000 mPa·s. An illustrative example of commercially available HPMC (d2) that is useful in the present invention is Methocel K4M ($DS_{methyl}$=1.1-1.6; $MS_{hydroxypropyl}$=0.1-0.3; 2% by weight viscosity=4000 mPa·s), available from The Dow Chemical Company, Midland, U.S.A.

$DS_{methyl}$ designates the average number of hydroxyl groups substituted by methoxy groups per anhydroglucose unit. The $MS_{hydroxypropyl}$ is the average number of hydroxypropyl groups which are bound by an ether bond per mole of anhydroglucose unit. During the hydroxypropoxylation multiple substitutions can result in side chains.

The $DS_{methyl}$ and $MS_{hydroxypropyl}$ can be determined by Zeisel cleavage of the HPMC with hydrogen iodide and subsequent quantitative gas chromatographic analysis (G. Bartelmus and R. Ketterer, Z. Anal. Chem., 286 (1977) 161-190).

As already described before, it is an essential feature of the present invention to keep the amounts of HPMC (d1) and HPMC (d2) within the weight ratio range of from 3:1 to 13:1.

The whippable topping composition of the present invention comprises 0.02 to 0.4% by weight, preferably from 0.05 to 0.3% by weight, and more preferably from 0.1 to 0.2% by weight of protein (e), all percentages being based on the total weight of the whippable topping composition. The term "protein" as used in the present application includes one type of protein as well as mixtures of different types of proteins. Examples of proteins (e) for use in the present invention include sodium caseinate and isolated soy protein. The function of the protein is to stabilize the emulsion before whipping and increase the overrun of the product. The total amount of protein(s) is within the before-defined ranges.

In addition to the HPMCs (d) the whippable topping composition of the present invention may optionally comprise 0 to 0.17% by weight, preferably 0.01 to 0.15% by weight, more preferably 0.03 to 0.12% by weight, even more preferably 0.05 to 0.11% by weight, and most preferably 0.06 to 0.1% by weight of a further non-protein hydrocolloid stabilizer (f), all percentages being based on the total weight of the whippable topping composition. The term "non-protein hydrocolloid stabilizer" as used in the present application includes one type of non-protein hydrocolloid stabilizer as well as mixtures of different types of non-protein hydrocolloid stabilizers. Typically, the non-protein hydrocolloid stabilizer (f) is a polysaccharide hydrocolloid (including polysaccharide derivatives), preferably a natural gum. Polysaccharide hydrocolloids are polysaccharides that form colloidal dispersions in water. Typically, they are also able to form gels. Examples of natural gums that are useful in the present invention include vegetable gums such as guar gum, locust bean gum, gum arabic and konjac gum; gums derived from algae such as carrageenan gum (e.g. κ-carrageenan gum) and alginic acid and its salt alginate; gums derived from bacteria such as gellan gum and xanthan gum; and mixtures thereof. Alginic acid and/or alginate are especially preferred. Typically, alginate is employed in the present invention, for example sodium and/or calcium alginate. Alginic acid/alginate are extracted from seaweeds, such as giant kelp (Macrocystis pyrifera). The optional non-protein hydrocolloid stabilizer is used for an auxiliary viscosity adjustment. The total amount of non-protein hydrocolloid stabilizer(s) is within the before-defined ranges.

As a further optional additive phosphate salts, such as $Na_2HPO_4$, $NaH_2PO_4$, and $Na_3PO_4$, preferably $Na_2HPO_4$, may be contained in the present whippable topping composition. The phosphate salts are believed to chelate divalent metal ions, such as calcium, and to also assist in reducing the effects of these metal ions on protein solubility and protein interactions. Divalent metal ions in the whippable topping composition may originate from different sources, for example calcium alginate or dry milk solids that may be added to the composition. Phosphate salts are preferably included in the whippable topping composition if a source for divalent metal ions is present. Phosphate salts, especially $Na_2HPO_4$, may also added to adjust the pH value of the whippable topping composition. If used the phosphate salt(s) is (are) contained in amount of no more than 0.6% by weight, preferably in an amount of from 0.05 to 0.3% by weight, and more preferably from 0.1 to 0.2% by weight, all percentages being based on the total weight of the whippable topping composition.

As another optional additive NaCl may be contained in the present whippable topping composition. NaCl can increase the ionic strength, and then increases the rate of partial coalescence of fat globule and thus accelerates the whipping process. If used NaCl is contained in amount of no more than 0.5% by weight, preferably in an amount of from 0.05 to 0.4% by weight, and more preferably from 0.1 to 0.3% by weight, all percentages being based on the total weight of the whippable topping composition.

The present whippable topping composition may contain further optional additives such as flavoring agents and colorants.

Typically, the total amount of further ingredients in addition to components (a) to (f) described before does not exceed 2% by weight, based on the total weight of the whippable topping composition.

Water makes up the remainder of the whippable topping composition and is contained in an amount adding up to 100% by weight of the composition. The amount of water typically ranges from 21.8 to 81.4% by weight, preferably from 35.6 to 75.1% by weight, more preferably from 42.9 to 71.8% by weight, even more preferably from 48.6 to 69.1% by weight, and most preferably from 52.9 to 63.8% by weight, all percentages being based on the total weight of the whippable topping composition.

In a preferred embodiment the whippable topping composition comprises:
(a) 15 to 27% by weight, preferably 17 to 25% by weight of water-soluble carbohydrates;
(b1) 9 to 20% by weight, preferably 10 to 18% by weight of hydrogenated vegetable fat;
(c) 0.6 to 1.3% by weight, preferably 0.7 to 1.2% by weight of emulsifier formulation;
(d1) 0.2 to 0.6% by weight, preferably 0.3 to 0.5% by weight of the first hydroxypropyl methylcellulose having an average degree of substitution $DS_{methyl}$ of from 1.4 to 2.5 and a 2% by weight aqueous solution viscosity of from 20 to 100 mPa·s;
(d2) 0.02 to 0.08% by weight, preferably 0.03 to 0.06% by weight of the second hydroxypropyl methylcellulose having an average degree of substitution $DS_{methyl}$ of from 0.8 to 1.9 and a 2% by weight aqueous solution viscosity of from 2800 to 5500 mPa·s;
(e) 0.05 to 0.3% by weight, preferably 0.1 to 0.2% by weight of protein; and
(f) 0.03 to 0.12% by weight, preferably 0.06 to 0.1% by weight of non-protein hydrocolloid stabilizer, preferably alginate;
(g) water in an amount adding up to 100% by weight, and
(h) optional additives in a total amount of from 0 to 2% by weight,
all percentages being based on the total weight of the whippable topping composition.

In another preferred embodiment the whippable topping composition comprises:
(a) 15 to 27% by weight, preferably 17 to 25% by weight of water-soluble carbohydrates;
(b1) 9 to 20% by weight, preferably 10 to 18% by weight of hydrogenated vegetable fat;
(b2) 6 to 13% by weight, preferably 8 to 10% by weight of milk fat;
(c) 0.6 to 1.3% by weight, preferably 0.7 to 1.2% by weight of emulsifier formulation;
(d1) 0.2 to 0.6% by weight, preferably 0.3 to 0.5% by weight of the first hydroxypropyl methylcellulose having an average degree of substitution $DS_{methyl}$ of from 1.4 to 2.5 and a 2% by weight aqueous solution viscosity of from 20 to 100 mPa·s;
(d2) 0.02 to 0.08% by weight, preferably 0.03 to 0.06% by weight of the second hydroxypropyl methylcellulose having an average degree of substitution $DS_{methyl}$ of from 0.8 to 1.9 and a 2% by weight aqueous solution viscosity of from 2800 to 5500 mPa·s;
(e) 0.05 to 0.3% by weight, preferably 0.1 to 0.2% by weight of protein; and
(f) 0.03 to 0.12% by weight, preferably 0.06 to 0.1% by weight of non-protein hydrocolloid stabilizer, preferably alginate;
(g) water in an amount adding up to 100% by weight, and
(h) optional additives in a total amount of from 0 to 2% by weight,
all percentages being based on the total weight of the whippable topping composition.

The whippable topping composition of the present invention is typically an oil-in-water emulsion and can be whipped by any means that are normally used to prepare whipped toppings from liquid formulations such as a common domestic whipping machine for use in the kitchen. The present invention is also directed to whipped toppings prepared from the above-described whippable topping composition.

The whipped toppings of the present invention have high overrun as well as good firmness, height change ratio (definition is given in the examples) and water syneresis. And most remarkably, those properties are not deteriorated substantially when the whippable topping composition is whipped after it was frozen and thawed. It is believed that one reason for the decline of the performance of ordinary whippable toppings after freezing is the mechanical damage of the fat globule membrane by the ice crystals. The stabilizer/emulsifier combination used in the inventive topping composition seems to considerably strengthen the fat globule membrane to prevent or at least impede damage by the ice crystals.

The whippable topping compositions or the whipped toppings of the present invention can be used to prepare a large variety of edible products.

The present whippable topping compositions can be obtained by any method known to prepare oil-in-water emulsions. One exemplary method comprises the following steps:

(i) dispersing emulsifier compound(s) (ci), HPMCs (d), protein (e) and optional further non-protein hydrocolloid stabilizer (f) in the fat(s) (b) to form an oil phase, preferably by melting the fat(s) (b);

(ii) dissolving or dispersing water-soluble carbohydrates (a) and further optional water-soluble or water-dispersible ingredients in water to form an aqueous phase;

(iii) mixing the aqueous phase from (ii) with the oil phase from (i);

(iv) pasteurizing the mixture;

(v) homogenizing the mixture;

(vi) cooling down the mixture quickly to a temperature of from 4 to 8° C.; and (vii) aging the mixture at a temperature of from 3 to 7° C.

In step (i) the oil phase is formed by dispersing the above ingredients in the fats (b), preferably by heating the fat, typically to a temperature of from 55 to 75° C., preferably from 60 to 70° C., in order to melt the fat. Dispersion is typically assisted by agitation.

The aqueous phase is formed in step (ii) by dissolving water-soluble carbohydrates (a) and dissolving or dispersing further optional water-soluble or water-dispersible ingredients in water. This step is typically performed under the influence of heat and agitation (stirring) in order to achieve complete dissolution of the water-soluble carbohydrates (a) and good dissolution/dispersion of any other optional ingredients. Preferred temperatures range from 55 to 85° C., more preferably from 60 to 80° C. The ingredients may be added to the already heated water or heating may start after addition of the ingredients. The selected temperature may be maintained during mixing.

In the mixing step (iii) the aqueous and oil phases are combined and mixed, typically under agitation (stirring) in order to achieve good dispersion. Preferably, the aqueous phase is added to the oil phase. This kind of addition is sometimes called "phase inversion method". If the mixing is performed at higher temperatures, typically of from 60 to 90° C., preferably from 70 to 80° C., pasteurizing step (iv) is conducted simultaneously. Alternatively, the aqueous and oil phases may be first mixed and then pasteurized in a subsequent step at the preferred temperatures described before. In the pasteurizing step (iv) (performed simultaneously or subsequently) the described temperatures are typically maintained for a time period of from 15 to 40 min, preferably from 20 to 30 min. Pasteurizing reduces microorganism to ensure an acceptable shelf life of the edible topping composition.

Homogenization, preferably high pressure homogenization, e.g. at pressures from 20,000 to 65,000 kPa (200 to 650 bar), more preferably from 25,000 to 55,000 kPa (250 to 550 bar), and most preferably at about 55,000 kPa (550 bar), of the composition is performed next in step (v). Although homogenization (v) may be accomplished in one stage, in some embodiments, homogenization is carried out in two stages, i.e. in a first stage operated at a higher pressure and a second stage operated at a lower pressure. Preferably, the pressure is maintained during the first stage at a minimum of 20,000 kPa (200 bar) and a maximum of 65,000 ka (650 bar), preferably at about 55,000 kPa (550 bar), and the second stage is preferably operated at a pressure of at least 2,000 kPa (20 bar) and less than 10,000 kPa (100 bar), preferably at about 5,000 kPa (50 bar).

Quick cooling down to a temperature of from 4 to 8° C., preferably to about 4° C., follows in step (vi). The quick cooling down allows the fat to well crystallize and keep the fat globuli small. "Quick cooling" as used herein means cooling down to a temperature of from 4 to 8° C. within a time period of 10 to 20 s, preferably 3 to 5 s.

An aging step (vii) at a temperature of from 3 to 7° C., preferably at about 4° C., is performed afterwards. The composition is typically held at these temperatures for 60 to 300 min, preferably for 180 to 240 min. Aging promotes the crystallization of the fat globuli, which is a precondition for the whippability of the topping composition. A poor fat crystallization results in a low overrun of the whipped topping.

An alternative exemplary method of preparing the above-described whippable topping composition steps comprises the following steps:

(i') dispersing or dissolving water-soluble carbohydrates (a), one part of emulsifier formulation (c), HPMCs (d), protein (e), optional further non-protein hydrocolloid stabilizer (f) and further optional water-soluble or water dispersible ingredients in water to form an aqueous phase;

(ii') dispersing the other part of the emulsifier formulation (c) in the fat(s) (b) to form an oil phase, preferably by melting the fat(s) (b);

(iii') mixing the aqueous phase from (i) with the oil phase from (ii);

(iv) pasteurizing the mixture;

(v) homogenizing the mixture;

(vi) cooling down the mixture quickly to a temperature of from 4 to 8° C.; and (vii) aging the mixture at a temperature of from 3 to 7° C.

The aqueous phase is formed in step (i') by dispersing or dissolving the above-motioned ingredients in water. This step is typically performed under the influence of heat and agitation (stirring) in order to achieve good dissolution/dispersion. Preferred temperatures range from 70 to 95° C., more preferably from 85 to 90° C. The ingredients may be added to the already heated water or heating may start after addition of the ingredients. The selected temperature may be maintained during mixing.

In step (ii') the oil phase is formed by dispersing the other part of the emulsifier formulation (c) in the fat (b), preferably by heating the fat, typically to a temperature of from 55 to 75°

C., preferably from 60 to 70° C., in order to melt the fat. Dispersion is typically assisted by agitation.

In step (iii') the aqueous and oil phases are combined and mixed, typically under agitation (stirring) in order to achieve good dispersion. Preferably, the oil phase is added to the aqueous phase. Further steps (iv) to (vii) are preformed as in the first alternative method and everything described above equally applies to this alternative.

The whippable topping composition obtained after the aging step (vii) may be frozen for long shelf life, typically by cooling down the composition to a temperature of about −18° C. Usually, the whippable topping composition will be put on the market in the frozen state and kept frozen until the consumer wants to whip it. Before whipping, the customers have to thaw it, typically to a temperature of about 4° C. Alternatively, the whippable topping composition obtained after the aging step (vii) may be whipped directly, if the whipped product is to be commercialized. Like for the unwhipped topping composition, shelf life of the whipped topping can be increased by freezing it.

Some embodiments of the invention will now be described in detail in the following examples wherein all parts and percentages are by weight unless otherwise specified.

EXAMPLES

| Raw Materials | |
|---|---|
| Ingredient | Supplier |
| Hydrogenated palm kernel oil (LHK41-02ZY) (melting point, 41° C.) | Yihai Kerry, Shanghai, China |
| Milk fat | Junlong Co., China |
| Tween 60 (GLYCOSPER SE S-20) (HLB = 14.9) | LONZA, Basel, Switzerland |
| Sodium Stearoyl Lactylat (FINAMUL-97) (SSL) | FINE ORGANICS, Mumbai, India, |
| Distilled Monoglycerides (DIMODAN ®) (DMG) | Danisco, Copenhagen, Denmark |
| Glyceryl mono- and distearate (GMS) | Zhengtong Chemical Co., Ltd, Henan, China |
| Granulated sugar (Sucrose) | Taikoo, Shanghai, China |
| HPMC (METHOCEL F50) | The Dow Chemical Company, Midland, U.S.A. |
| HPMC (METHOCEL K4M) | The Dow Chemical Company, Midland, U.S.A. |
| Alginate | FMC, Philadelphia, U.S.A |
| Sodium Caseinate | Junlong Co., China |
| NaCl | China National Salt Industry Corporation |
| $Na_2HPO_4$ | Shenzhen Esun Industrial Co., Ltd |

Testing Methods

Overrun, texture (mouthfeel), height change ratio, and water syneresis were measured to evaluate the performance of the whipped toppings.

(1) Overrun:

Overrun was determined by using the following equation, where $M_1$ is the mass of a fixed volume of unwhipped topping and $M_2$ the mass of the same volume of whipped topping.

$$overrun = \frac{M_1 - M_2}{M_2} \times 100\%$$

(2) Texture (Firmness):

Texture of samples was analyzed by a texture analyzer produced by Micro Stable System. A whipped topping was packed into a plastic box for measurement. From texture analysis, firmness of the samples could be evaluated, which is an indicator of mouthfeel. Settings of the texture analyzer:

Test mode: compression;
Test option: return to start.
Trigger force: 5 g.
Pre-test speed: 1 mm/s
Test speed: 1 mm/s
Post-test speed: 5 mm/s
Test distance: 20 mm
Probe: P/36R (3) Height Change Ratio A whipped topping was molded in peak-shape, and its height was measured at 38° C. immediately after molding and after 3 h. The height change ratio could be calculated by the following equation:

$$(H_1 - H_2)/H_1$$

where $H_1$ is the initiate peak height, and $H_2$ is the end-point peak height.

(4) Water Syneresis

Testing was at 38° C. to evaluate water syneresis even in hot weather.

Water syneresis was measured by a self-made instrument, shown in FIG. 1. Firstly, an empty bottle with a lid was weighed and its weight was noted as $m_1$. Then, a metal gauze was put in the bottle. Some certain mass (M) of whipped topping was put on the metal gauze. Thirdly, the whole bottle was put into an oven at 38° C. Fourthly, after about 220 min, the bottle was taken out from the oven, and the metal gauze and topping were taken out of the bottle. Lastly, the weight of the bottle and lid was determined and noted as $m_2$. So the water syneresis per g of topping could be calculated by $(m_2 - m_1)/M$.

Preparation of Whipped Toppings

The inventive whippable topping composition Examples 1 and 2 and the comparative examples 3 to 7 were prepared as follows from the ingredients listed in Table1:

For preparing the oil phase milk fat, where used, and hydrogenated palm kernel oil were molten in a water bath at 70° C. and stirred at 500 rpm. Emulsifiers, HPMCs, alginate, protein and salts were added into the oil phase at 70° C. and it was stirred at 500 rpm for 15 min.

Granulated sugar was added into 80° C. water and it was stirred for 10 min at 1000 rpm and 80° C.

The aqueous phase was added into the oil phase slowly at 70° C. It was stirred at 800 rpm and 70° C. for 30 min.

Afterwards, the compositions of all examples were subjected to high pressure homogenization (5500 bar/50 bar), then aged at 4° C. for 240 min. For each example, the formulation prepared was split up and one part was whipped directly whereas the other part was frozen at −18° C. for about 48 h, thawed to 4° C. within about 12 h and then whipped for 6 min using a whipping machine from Sinmag company and a whipping speed of about 150 rpm. The values for overrun, texture, height change ration and water syneresis were determined before freeze and after freeze and thaw as described before. The results are shown in Table 2.

TABLE 1

Formulation Overview (amounts in % by weight)

|  | Inventive Example 1 | Inventive Example 2 | Comparative Example 3 | Comparative Example 4 | Comparative Example 5 | Comparative Example 6 | Comparative Example 7 |
|---|---|---|---|---|---|---|---|
| Granulated sugar | 24% | 24% | 24% | 24% | 24% | 24% | 24% |
| Hydrog. palm kernel oil | 16% | 16% | 16% | 16% | 16% | 16% | 16% |
| Milk fat | 9.27% | — | 9.27% | 9.27% | 9.27% | — | — |
| Tween 60 | — | — | 0.33% | — | — | — | — |
| SSL | 0.47% | 0.47% | 0.47% | 0.47% | 0.47% | 0.47% | 0.47% |
| DMG | 0.33% | 0.33% | — | 0.33% | 0.33% | 0.33% | 0.33% |
| GMS | 0.2% | 0.2% | 0.2% | 0.2% | 0.2% | 0.2% | 0.2% |
| HPMC (Methocel F50) | 0.42% | 0.42% | 0.42% | 0.42% | 0.42% | 0.42% | 0.47% |
| HPMC (Methocel K4M) | 0.05% | 0.05% | 0.05% | 0.22% | 0.03% | — | — |
| Alginate | 0.09% | 0.09% | 0.09% | 0.09% | 0.09% | 0.09% | 0.09% |
| Protein | 0.2% | 0.2% | 0.2% | 0.2% | 0.2% | 0.2% | 0.2% |
| NaCl | 0.1% | 0.1% | 0.1% | 0.1% | 0.1% | 0.1% | 0.1% |
| $Na_2HPO_4$ | 0.1% | 0.1% | 0.1% | 0.1% | 0.1% | 0.1% | 0.1% |
| Added water | 48.77 | 58.04% | 48.77 | 48.60 | 48.79 | 58.09% | 58.04% |
| F50/K4M (weight ratio) | 8.4 | 8.4 | 8.4 | 1.9 | 14 | Positive infinite | Positive infinite |
| HLB of emulsifier formul. | 6.3 | 6.3 | 9.6 | 6.3 | 6.3 | 6.3 | 6.3 |

TABLE 2

Testing Results

|  | Inventive Example 1 | | Inventive Example 2 | | Comparative Example 3 | | Comparative Example 4 | | Comparative Example 5 | | Comparative Example 6 | | Comparative Example 7 | |
|---|---|---|---|---|---|---|---|---|---|---|---|---|---|---|
|  | Before freeze | After thaw | Before freeze | After thaw | Before freeze | After thaw | Before freeze | After thaw | Before freeze | After thaw | Before freeze | After thaw | Before freeze | After thaw |
| Overrun (%) | 292 | 298 | 309 | 312 | 303 | 297 | 239 | 229 | 299 | 271 | 292 | 251 | 310 | 287 |
| Firmness (g) | 128.7 | 154.8 | 246.7 | 258.6 | 111.8 | 294.6 | 197.6 | 143.2 | 102.7 | 132.7 | 210.8 | 215.3 | 220.2 | 200.5 |
| Height change ratio (%) | 12 | 15 | 9 | 12 | 15 | 35 | 21 | 28 | 23 | 21 | 30 | 40 | 25 | 29 |
| Water syneresis (g water/g topping) | 0 | 0 | 0.15 | 0.11 | 0.06 | 0 | 0 | 0 | 0 | 0 | 0.21 | 0.31 | 0.17 | 0.28 |

As can be seen from Table 2 that there is no significant performance fluctuation of Inventive Examples 1 and 2 before and after freeze.

The HLB value of Comparative Example 3 is larger than 9 due to the addition of Tween 60, a high HLB surfactant, its firmness increases strongly and thus, the whipped composition becomes very stiff which deteriorates the mouthfeel. The height change ratio also considerably increases after thaw which means its thermal stability becomes worse.

In Comparative Example 4 the F50/K4M weight ratio is smaller than 3 and its overrun before and after freeze is lower than that of Inventive Examples 1 and 2. In addition to that, its firmness becomes much lower after thaw than that before freeze.

In Comparative Example 5 the F50/K4M weight ratio is larger than 13 and its overrun after thaw decreases strongly compared to that before freeze. Obviously, the formulation can no longer trap air effectively.

Comparative Examples 6 and 7 do not contain any K4M and similar to Inventive Example 2 they are also free of milk fat. As compared to Inventive Example 2 the overrun, height change ratio and water syneresis of Comparative Examples 6 and 7 deteriorate strongly after the freeze-thaw cycle.

What is claimed is:
1. An edible whippable topping composition comprising:
(a) 10 to 30% by weight of water-soluble carbohydrates;
(b1) 8 to 30% by weight of hydrogenated vegetable fat;
(b2) 0 to 13% by weight of milk fat;
(c) 0.5 to 1.5% by weight of an emulsifier formulation consisting of 1 to n different emulsifier compounds (ci) and having an $HLB_{Formulation}$ value according to formula (I) of less than 9:

$$HLB_{Formulation} = \sum_{i=1}^{n} (HLB_i \cdot x_i) \quad (I)$$

wherein $HLB_i$ and $x_i$ are the HLB value and weight fraction (based on the total weight of the emulsifier formulation) of the ith emulsifier compound (ci);
(d1) 0.05 to 0.9% by weight of a first hydroxypropyl methylcellulose having an average degree of substitution $DS_{methyl}$ of from 1.4 to 2.5 and a 2% by weight aqueous solution viscosity of from 20 to 100 mPa·s;
(d2) 0.005 to 0.2% by weight of a second hydroxypropyl methylcellulose having an average degree of substitution $DS_{methyl}$ of from 0.8 to 1.9 and a 2% by weight aqueous solution viscosity of from 2800 to 5500 mPa·s;
(e) 0.02 to 0.4% by weight of protein;
(f) 0 to 0.17% by weight of non-protein hydrocolloid stabilizer different from components (d1) and (d2); and
(g) water in an amount adding up to 100% by weight,
all percentages being based on the total weight of the whippable topping composition, wherein the weight ratio of first hydroxypropyl methylcellulose (d1) to the second hydroxypropyl methylcellulose (d2) is within the range of from 3:1 to 13:1.

2. The edible whippable topping composition of according to claim 1 comprising:
(b1) 8 to 20% by weight of hydrogenated vegetable fat;
(b2) 6 to 13% by weight of milk fat.

3. The edible whippable topping composition according to claim 1 wherein the weight ratio of first hydroxypropyl methylcellulose (d1) to second hydroxypropyl methylcellulose (d2) is within the range of from 4:1 to 12:1.

4. The edible whippable topping composition according to claim 1 wherein the water-soluble carbohydrates (a) are selected from monosaccharides, disaccharides and mixtures thereof.

5. The edible whippable topping composition according to claim 1 wherein the hydrogenated vegetable fat (b1) is selected from hydrogenated palm kernel oil, hydrogenated coconut oil, hydrogenated cottonseed oil, hydrogenated peanut oil, hydrogenated olive oil, hydrogenated corn oil, hydrogenated soybean oil and hydrogenated palm oil, and mixtures thereof.

6. The edible whippable topping composition according to claim 1 wherein the emulsifier formulation (c) has an $HLB_{Formulation}$ value of less than 8.

7. The edible whippable topping composition according to claim 1 wherein the emulsifier compounds (ci) of emulsifier formulation (c) have a molecular weight of less than 2000.

8. The edible whippable topping composition according to claim 1 wherein the protein (e) is selected from sodium caseinate, isolated soy protein, and mixtures thereof.

9. The edible whippable topping composition according to claim 1 comprising 0.01 to 0.17% by weight of non-protein hydrocolloid stabilizer (f) different from components (d1) and (d2).

10. The edible whippable composition according to claim 9 wherein the non-protein hydrocolloid stabilizer (f) is a natural gum.

11. The edible whippable topping composition according to claim 1 further comprising 0 to 2% by weight, based on the total weight of the whippable topping composition, of optional additives (h).

12. A method for preparing an edible whippable topping composition comprising:
(a) 10 to 30% by weight of water-soluble carbohydrates;
(b1) 8 to 30% by weight of hydrogenated vegetable fat;
(b2) 0 to 13% by weight of milk fat;
(c) 0.5 to 1.5% by weight of an emulsifier formulation consisting of 1 to n different emulsifier compounds (ci) and having an $HLB_{Formulation}$ value according to formula (I) of less than 9:

$$HLB_{Formulation} = \sum_{i=1}^{n} (HLB_i \cdot x_i) \qquad (I)$$

wherein $HLB_i$ and $x_i$ are the HLB value and weight fraction (based on the total weight of the emulsifier formulation) of the ith emulsifier compound (ci);
(d1) 0.05 to 0.9% by weight of a first hydroxypropyl methylcellulose having an average degree of substitution $DS_{methyl}$ of from 1.4 to 2.5 and a 2% by weight aqueous solution viscosity of from 20 to 100 mPa s;
(d2) 0.005 to 0.2% by weight of a second hydroxypropyl methylcellulose having an average degree of substitution $DS_{methyl}$ of from 0.8 to 1.9 and a 2% by weight aqueous solution viscosity of from 2800 to 5500 mPa s;
(e) 0.02 to 0.4% by weight of protein;
(f) 0 to 0.17% by weight of non-protein hydrocolloid stabilizer different from components (d1) and (d2); and
(g) water in an amount adding up to 100% by weight,
all percentages being based on the total weight of the whippable topping composition,
wherein the weight ratio of the first hydroxypropyl methylcellulose (d1) to the second hydroxypropyl methylcellulose (d2) is within the range of from 3:1 to 13:1;
wherein the method comprises the steps:
(i) dispersing emulsifier compound(s) (ci), hydroxypropyl methylcellulose (d1), hydroxypropyl methylcellulose (d2), protein (e), and optional further non-protein hydrocolloid stabilizer (f) in the fat(s) (b) to form an oil phase;
(ii) dissolving or dispersing water-soluble carbohydrates (a) and further optional water-soluble or water-dispersible ingredients in water to form an aqueous phase;
(iii) mixing the aqueous phase from (ii) with the oil phase from (i);
(iv) pasteurizing the mixture;
(v) homogenizing the mixture;
(vi) cooling down the mixture quickly to a temperature of from 4 to 8° C.; and
(vii) aging the mixture at a temperature of from 3 to 7° C.

\* \* \* \* \*